(12) United States Patent
Hosaka (10) Patent No.: US 9,576,228 B2
(45) Date of Patent: Feb. 21, 2017

(54) IMAGE PROCESSING APPARATUS, IMAGE PROCESSING METHOD, AND COMPUTER-READABLE RECORDING MEDIUM, FOR CONVERTING RESOLUTION OF IMAGE

(71) Applicant: Shigetoshi Hosaka, Kanagawa (JP)

(72) Inventor: Shigetoshi Hosaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/793,824

(22) Filed: Jul. 8, 2015

(65) Prior Publication Data
US 2016/0026904 A1   Jan. 28, 2016

(30) Foreign Application Priority Data
Jul. 22, 2014   (JP) .................................. 2014-149260

(51) Int. Cl.
| G06F 15/00 | (2006.01) |
| G06K 15/02 | (2006.01) |
| H04N 1/393 | (2006.01) |
| G06F 3/12  | (2006.01) |

(52) U.S. Cl.
CPC ....... *G06K 15/1876* (2013.01); *G06K 15/1871* (2013.01); *H04N 1/3935* (2013.01)

(58) Field of Classification Search
CPC  G06K 15/102; G06K 15/188; G06K 15/1853; G06K 15/1872; G06K 15/1878; B41J 2/2121
USPC ...... 358/1.1, 1.9, 3.06, 2.99, 3.01, 3.12, 3.3; 347/15
See application file for complete search history.

(56) References Cited

U.S. PATENT DOCUMENTS

| 2010/0128286 A1* | 5/2010 | Amir ........................ H04N 1/41 358/1.2 |
| 2011/0012947 A1* | 1/2011 | Matsuhira .......... H04N 1/40031 347/9 |
| 2011/0032554 A1* | 2/2011 | Matsuhira ................ H04N 1/56 358/1.9 |
| 2013/0070303 A1  | 3/2013 | Sakakibara .................. 358/3.06 |
| 2013/0120765 A1* | 5/2013 | Wozniak .............. G06K 15/102 358/1.2 |
| 2014/0233046 A1* | 8/2014 | Abe .......................... G06T 5/00 358/1.9 |

FOREIGN PATENT DOCUMENTS

| JP | 11-205591  | 7/1999 |
| JP | 2013-066002 | 4/2013 |

* cited by examiner

*Primary Examiner* — Gabriel Garcia
(74) *Attorney, Agent, or Firm* — Cooper & Dunham LLP (57) ABSTRACT

An image processing apparatus includes an input unit that inputs printing information containing image data and a conversion unit that, when the pixel value of the top pixel from among successive N pixels (N is an integer equal to or larger than 2) of the image data is a specific value, sets a pixel having a pixel value that is not the specific value as a new top pixel from among pixels from a pixel adjacent to the to pixel to the N-th pixel, refers to data of the new top pixel to the N-th pixel, and performs a conversion into pixel values that are calculated with coefficient values according to the magnitude of the pixel values.

7 Claims, 11 Drawing Sheets

|    | B0 | B1 | B2 | B3 | B4 | B5 | B6 | B7 | B8 | B9 |
|----|----|----|----|----|----|----|----|----|----|----|
| A0 |    |    |    |    | ▒  | ▒  |    |    |    |    |
| A1 |    |    |    |    | ▒  | ▒  |    |    |    |    |
| A2 | ▒  | ▒  | ▒  | ▒  | ▒  | ▒  | ▒  | ▒  | ▒  | ▒  |
| A3 |    |    |    |    | ▒  | ▒  |    |    |    |    |
| A4 |    |    |    |    | ▒  | ▒  |    |    |    |    | a0 AND a1 a2 AND a3 a4 AND a5 a6 AND a7 a8 AND a9

FIG.5B

|    | B0 | B1 | B2 | B3 | B4 | B5 | B6 | B7 | B8 | B9 |
|----|----|----|----|----|----|----|----|----|----|----|
| A0 |    |    |    |    | ▒  | ▒  |    |    |    |    |
| A1 |    |    |    |    | ▒  | ▒  |    |    |    |    |
| A2 | ▒  | ▒  | ▒  | ▒  | ▒  | ▒  | ▒  | ▒  | ▒  | ▒  |
| A3 |    |    |    |    | ▒  | ▒  |    |    |    |    |
| A4 |    |    |    |    | ▒  | ▒  |    |    |    |    | a0 AND a1 a2 AND a3 a4 AND a5 ⇒ a5 AND a6 a6 AND a7 ⇒ a7 AND a8 a8 AND a9

FIG.6A

|     | b0 | b1 | b2 | b3 | b4 | b5 | b6 | b7 | b8 | b9 | b10 | b11 |
|-----|----|----|----|----|----|----|----|----|----|----|-----|-----|
| a0  |    |    |    | ▒  | ▒  | ▒  |    |    |    |    |     |     |
| a1  |    |    |    | ▒  | ▒  | ▒  |    |    |    |    |     |     |
| a2  |    |    |    | ▒  | ▒  | ▒  |    |    |    |    |     |     |
| a3  | ▒  | ▒  | ▒  | ▒  | ▒  | ▒  | ▒  | ▒  | ▒  | ▒  | ▒   | ▒   |
| a4  | ▒  | ▒  | ▒  | ▒  | ▒  | ▒  | ▒  | ▒  | ▒  | ▒  | ▒   | ▒   |
| a5  | ▒  | ▒  | ▒  | ▒  | ▒  | ▒  | ▒  | ▒  | ▒  | ▒  | ▒   | ▒   |
| a6  |    |    |    | ▒  | ▒  | ▒  |    |    |    |    |     |     |
| a7  |    |    |    | ▒  | ▒  | ▒  |    |    |    |    |     |     |
| a8  |    |    |    | ▒  | ▒  | ▒  |    |    |    |    |     |     |

FIG.6B

|     | B0 | B1 | B2 | B3 |
|-----|----|----|----|----|
| A0  |    | ▒  |    |    |
| A1  |    | ▒  |    |    |
| A2  |    | ▒  |    |    |
| A3  | ▒  | ▒  | ▒  | ▒  |
| A4  | ▒  | ▒  | ▒  | ▒  |
| A5  | ▒  | ▒  | ▒  | ▒  |
| A6  |    | ▒  |    |    |
| A7  |    | ▒  |    |    |
| A8  |    | ▒  |    |    |

|  | b0 | b1 | b2 | b3 | b4 | b5 | b6 | b7 | b8 | b9 |
|---|---|---|---|---|---|---|---|---|---|---|
| a0 |  |  |  |  |  |  |  |  |  |  |
| a1 |  |  |  |  |  |  |  |  |  |  |
| a2 |  |  |  |  |  |  |  |  |  |  |
| a3 |  |  |  |  |  |  |  |  |  |  |
| a4 |  |  |  |  |  |  |  |  |  |  |
| a5 |  |  |  |  |  |  |  |  |  |  |
| a6 |  |  |  |  |  |  |  |  |  |  |
| a7 |  |  |  |  |  |  |  |  |  |  |
| a8 |  |  |  |  |  |  |  |  |  |  |
| a9 |  |  |  |  |  |  |  |  |  |  |

FIG.8B

|  | B0 | B1 | B2 | B3 | B4 | B5 | B6 | B7 | B8 | B9 |
|---|---|---|---|---|---|---|---|---|---|---|
| A0 |  |  |  |  |  |  |  |  |  |  |
| A1 |  |  |  |  |  |  |  |  |  |  |
| A2 |  |  |  |  |  |  |  |  |  |  |
| A3 |  |  |  |  |  |  |  |  |  |  |
| A4 |  |  |  |  |  |  |  |  |  |  |

FIG.9A

|    | b0 | b1 | b2 | b3 | b4 | b5 | b6 | b7 | b8 | b9 |
|----|----|----|----|----|----|----|----|----|----|----|
| a0 |    |    |    |    |    |    |    |    |    |    |
| a1 |    |    |    |    |    |    |    |    |    |    |
| a2 |    |    |    |    |    |    |    |    |    |    |
| a3 |    |    |    |    |    |    |    |    |    |    |
| a4 |    |    |    |    |    |    |    |    |    |    |
| a5 |    |    |    |    |    |    |    |    |    |    |
| a6 |    |    |    |    |    |    |    |    |    |    |
| a7 |    |    |    |    |    |    |    |    |    |    |
| a8 |    |    |    |    |    |    |    |    |    |    |
| a9 |    |    |    |    |    |    |    |    |    |    |

FIG.9B

|    | B0 | B1 | B2 | B3 | B4 | B5 | B6 | B7 | B8 | B9 |
|----|----|----|----|----|----|----|----|----|----|----|
| A0 |    |    |    |    |    |    |    |    |    |    |
| A1 |    |    |    |    |    |    |    |    |    |    |
| A2 |    |    |    |    |    |    |    |    |    |    |
| A3 |    |    |    |    |    |    |    |    |    |    |
| A4 |    |    |    |    |    |    |    |    |    |    |

IMAGE PROCESSING APPARATUS, IMAGE PROCESSING METHOD, AND COMPUTER-READABLE RECORDING MEDIUM, FOR CONVERTING RESOLUTION OF IMAGE

CROSS-REFERENCE TO RELATED APPLICATIONS

The present application claims priority to and incorporates by reference the entire contents of Japanese Patent Application No. 2014-149260 filed in Japan on Jul. 22, 2014.

BACKGROUND OF THE INVENTION

1. Field of the Invention

The present invention relates to an image forming apparatus, an image processing method, and a computer-readable recording medium.

2. Description of the Related Art

When an image is formed with an inkjet printer that forms dots by ink droplets, low-resolution printing at a low resolution is performed in order to increase the productivity. Under such a printing condition, when the printing resolution is lower than the resolution of an input image, it is necessary to perform processing for a conversion into a printable resolution by performing a resolution conversion. A nearest neighbor method, an averaging method, and a weighting method, which will be described below, are known as methods of converting image data into a resolution lower than that of an input image. FIGS. 8 to 12 show these exemplary resolution conversions.

The nearest neighbor method is a conversion method of thinning out image data at regular intervals. The averaging method is a conversion method of thinning out image data after averaging an image per given unit of pixels. The weighting method is a conversion method in which, with reference to the pixel values at adjacent positions, (dark) pixels each having a large pixel value is multiplied by a large coefficient and (light) pixels each having a small pixel value is multiplied by a small coefficient to calculate pixel values after resolution conversion.

When an image, like a CAD drawing (architectural or mechanical design drawing), with a lot of lines in which black and white are clear is printed, the above-described resolution conversion methods have the following disadvantages respectively. In the nearest neighbor method, the processing speed is fast because it suffices if pixels are thinned out according to predetermined rules; however, there may be vertical and horizontal linear missing pixels. Because, for example, no vertical or horizontal line may be printed, the printing quality lowers significantly. Thus, it is not possible to use the nearest neighbor method for CAD drawings in which a missing image is a problematic.

In the averaging method, missing image data that can be seen in the nearest neighbor method does not occur; however, when there are a lot of lines in which black and white are clear in, for example, a CAD drawing, the pixel values of a black part and a white part are averaged and accordingly the pixel values reduce in a wide area, so that the lines are expressed lighter and bolder and the quality of the lines thus deteriorates.

In weighting method, because missing image data that can be seen in the nearest neighbor method does not occur and a reduction in the pixel value that can be seen in the averaging method is not caused, the printing quality hardly lowers in an image of, for example, lines or characters in which black and white are clear; however, when there are multiple sets of image data in the same form in an input image, the width or height of the image data after resolution conversion may change depending on the set of coordinates of the image data and accordingly a difference may be caused between the printing results even they originate from the same image data (see FIG. 12, which will be described below). This may be a significant problem when lines each having a narrow width, i.e., "fine lines", are to be expressed. This problem may occur also in the above-described nearest neighbor method and the averaging method.

A method is disclosed in which, when printing at a resolution reduced from that of an input image is performed, the nearest neighbor method and the averaging method are selectable according to the enlarging or reducing processing on the input image for the purpose of balancing the printing quality and the processing speed (see, for example, Japanese Laid-open Patent Publication No. 2013-66002).

The above-described conventional resolution conversion method, however, has a problem in that a difference occurs in the line quality. According to Japanese Laid-open Patent Publication No. 2013-66002, even when there are multiple sets of image data in the same shape in an input image, the width or height of the image data after resolution conversion may change depending on the set of coordinates of the image data and accordingly a difference may be caused in the printing results although they originate from the image data of the same shape.

In view of the above-described circumstances, there is a need to prevent missing image data and lowering of the image quality and also prevent a difference caused in the quality of printing lines.

SUMMARY OF THE INVENTION

It is an object of the present invention to at least partially solve the problems in the conventional technology.

According to example embodiment of the present invention, there is provided: an image processing apparatus comprising: an input unit that inputs printing information containing image data; and a conversion unit that, when the pixel value of the top pixel from among successive N pixels (N is an integer equal to or larger than 2) of the image data is a specific value, sets a pixel having a pixel value that is not the specific value as a new is pixel from among pixels from a pixel adjacent to the top pixel to the N-th pixel, refers to data of the new top pixel to the N-th pixel, and performs a conversion into pixel values that are calculated with coefficient values according to the magnitude of the pixel values.

Example embodiment of the present invention also provides an image processing method comprising: inputting printing information containing image data; and when the pixel value of the top pixel from among successive N pixels (N is an integer equal to or larger than 2) of the image data is a specific value, setting a pixel having a pixel value that is not the specific value Z a new top pixel from among pixels from a pixel adjacent to the top pixel to the N-th pixel, referring to data of the new top pixel to the N-th pixel, and performing a conversion into pixel values that are calculated with coefficient values according to the magnitude of the pixel values.

Example embodiment of the present invention also provides a non-transitory computer-readable recording medium that contains a computer program that causes a computer to execute: inputting printing information containing image data; and when the pixel value of the top pixel from among successive N pixels (N is an integer equal to or larger than 2) of the image data is a specific value, setting a pixel having a pixel value that is not the specific value Z a new top pixel from among pixels from a pixel adjacent to the top pixel to the N-th pixel, referring to data of the new top pixel to the N-th pixel, and performing a conversion into pixel values that are calculated with coefficient values according to the magnitude of the pixel values.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A and 5B are explanatory diagrams showing an exemplary resolution conversion on the image data shown in FIG. 4;

DETAILED DESCRIPTION OF THE PREFERRED EMBODIMENTS

With reference to the accompanying drawings, an embodiment of an image forming apparatus, an image processing method, and a computer-readable recording medium having a computer program will be described in detail below.

Embodiment

Figure 8A:
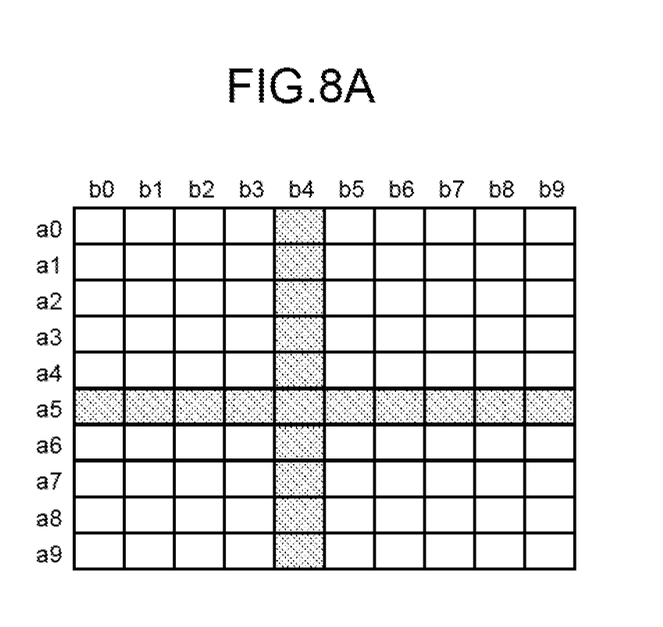
FIGS. 8A and 8B are explanatory diagrams showing an exemplary resolution conversion (1) using a nearest neighbor method.
Figure 8B:
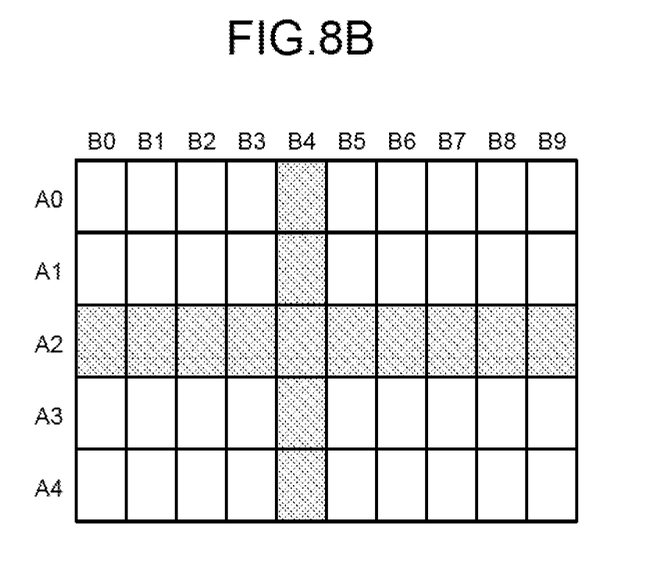

First, specific examples of the above-described resolution conversion methods will be described. FIGS. 8A and 8B are explanatory diagrams showing an exemplary resolution conversion (1) using a nearest neighbor method. FIG. 8A shows the resolution before the conversion and FIG. 8B shows the resolution after the conversion. As shown in FIGS. 8A and 8B, when there is no missing pixel, to halve the resolution in the sub-scanning direction, the data of even addresses (a0, a2, a4, a6 and a8) is thinned out to perform a conversion to a low resolution.

Figure 9A:
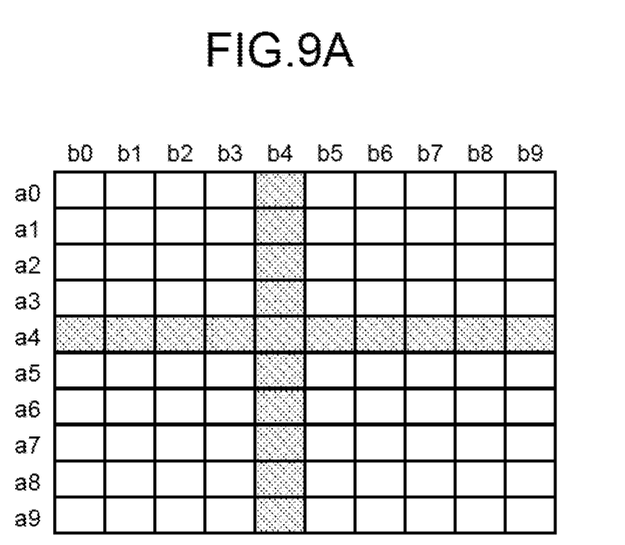
FIGS. 9A and 9B are explanatory diagrams showing an exemplary resolution conversion (2) using a nearest neighbor method.
Figure 9B:
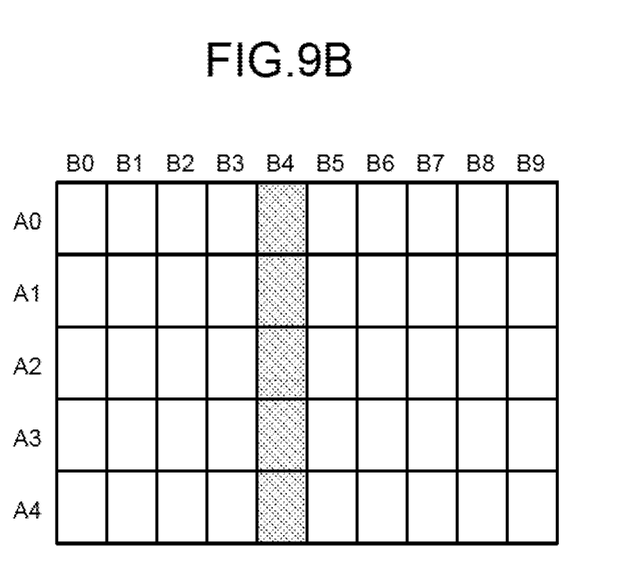

FIGS. 9A and 9B are explanatory diagrams showing an exemplary resolution conversion (2) using a nearest neighbor method. FIG. 9A shows the resolution before the conversion and FIG. 9B shows the resolution after the conversion. As shown in FIGS. 9A and 9B, when there are missing pixels, to halve the resolution in the sub-scanning direction, the data of even addresses (a0, a2, a4, a6 and a8) is thinned out to perform a conversion to a low-resolution.

Figure 10A:
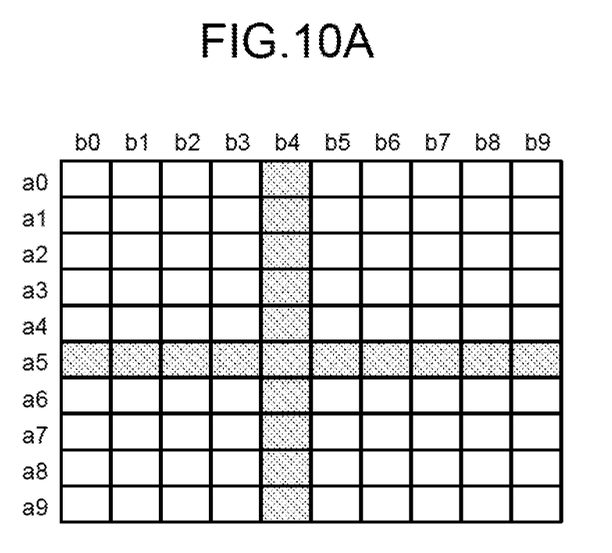
FIGS. 10A and 10B are explanatory diagrams showing an exemplary resolution conversion (3) using an averaging method.
Figure 10B:
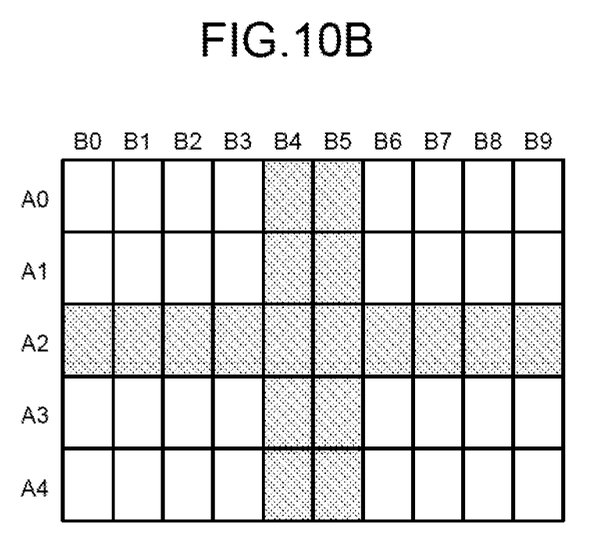

FIGS. 10A and 10B are explanatory diagrams showing an exemplary resolution conversion (3) using an averaging method. FIG. 10A shows the resolution before the conversion and FIG. 10B shows the resolution after the conversion. As shown in FIGS. 10A and 10B, to halve the resolution in the sub-scanning direction, an average of four pixels (for example, (a0,b0), (a0,b1), (a1,b0) and (a1,b1)) is calculated to perform a conversion to a low-resolution.

Figure 11A:
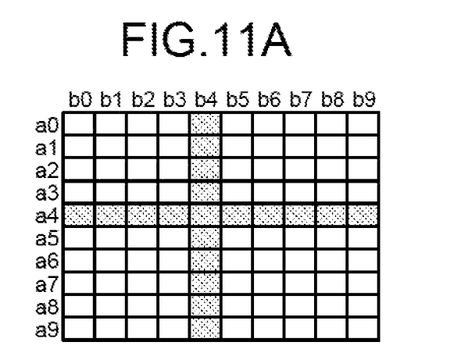
FIGS. 11A to 11D are explanatory diagrams showing an exemplary resolution conversion (4) using a weighting method.
Figure 11B:
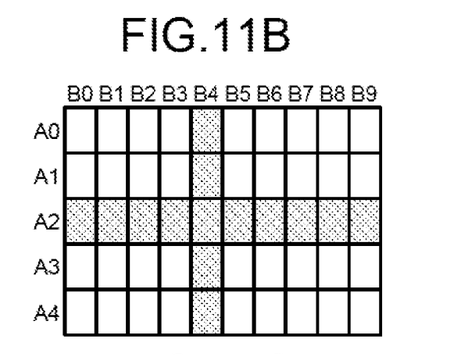
Figure 11C:
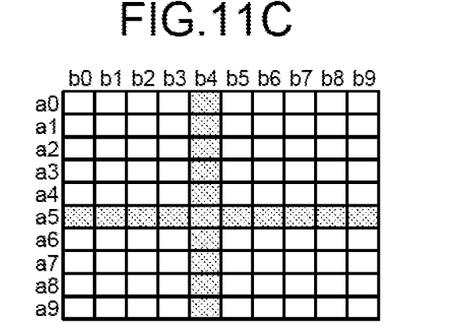
Figure 11D:
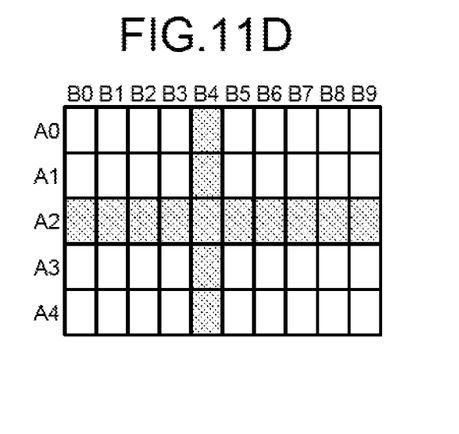
Figure 12A:
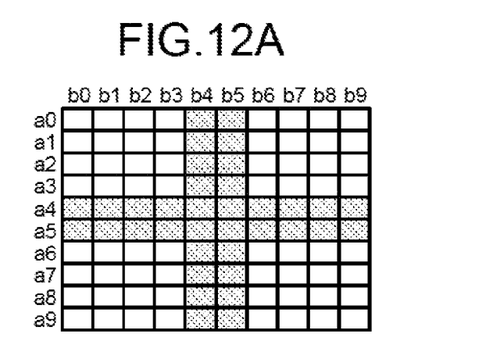
FIGS. 12A to 12D are explanatory diagrams showing an exemplary image that is problematic even with a weighting method.
Figure 12B:
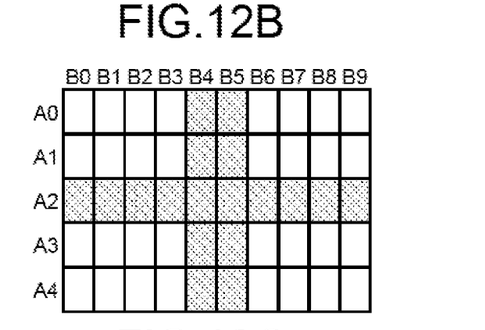
Figure 12C:
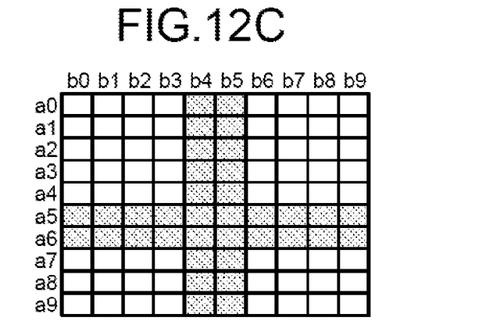
Figure 12D:
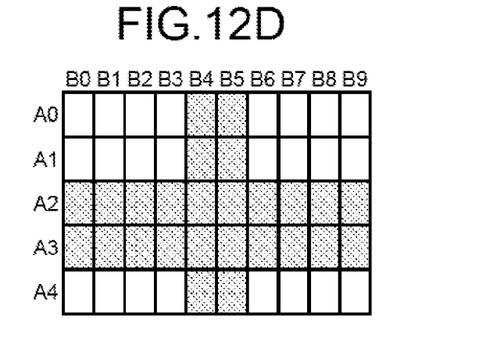

FIGS. 11A to 11D are explanatory diagrams showing an exemplary resolution conversion (4) using a weighting method. FIGS. 11A and 11C show the resolution before the conversion and FIGS. 11B and 11D show the resolution after the conversion. As shown in FIGS. 11A to 11D, a weighting method is used, the pixel values of a4 and a5 are refereed to, an average is calculated after each pixel having a larger pixel value is multiplied by a large coefficient to perform a conversion to a low resolution. FIGS. 12A to 12D are explanatory diagrams showing an exemplary image that is problematic even with a weighting method. FIGS. 12A and 12C show the resolution before the conversion and FIGS. 12B and 12D show the resolution after the conversion as described above.

According to the embodiment, in order to maximize the printing speed, the resolution of the input image is converted into a low resolution such that printing can be completed by performing carriage scanning once. The resolution conversion prevents the resolution conversion and missing image data and lowering of the image quality that cannot be avoided in the conventional resolution conversion and also prevents a difference caused in the quality of printing lines.

The overview of the conversion into a low resolution according to the embodiment will be described here. When a resolution conversion that lowers the resolution of an input image in the main-scanning direction or the sub-scanning direction to 1/N (N is an integer equal to or larger than 2), first, a pixel of interest corresponding to a pixel after the resolution conversion is set at the input image. Next, the pixel values of the pixel of interest and successive N pixels in a direction in which the resolution is lowered and at a downstream side of the data processing are referred to. For example, when the resolution is converted to ½, two pixel values of a pixel of interest and a pixel adjacent to the pixel of interest are referred to. When the resolution is converted to ⅓, three pixel values of a pixel of interest, a pixel adjacent to the pixel of interest, and a pixel adjacent to the pixel are referred to.

When the pixel value of the pixel of interest is a specific value, it is checked whether the pixel value of adjacent pixel is not the specific value. The specific value is, for example, a value representing a white pixel (e.g., 0). It will be assumed below that the specific value is 0, the fact that the pixel value is the specific value means that "the pixel of interest has no pixel value (the pixel value is 0)" and the fact that the pixel value is not the specific value means that "the pixel of interest has a pixel value". When the adjacent pixel has a pixel value, the pixel is set as a new pixel of interest and, using the pixel values of N pixels from the pixel, image data after the resolution conversion is created (see FIGS. 4A to 5B described below for the details).

According to this processing, when there is image data before the resolution conversion, the image data is assuredly reflected to the image data after the resolution conversion, and accordingly no missing image data occurs. Furthermore, as for the lines each configured of the same number of pixels, because the number of pixels does not change after the resolution conversion, the line width after the resolution conversion do not change depending on the set of coordinates of the input image data. This will be described in detail below with reference to the following drawings.

Figure 1:
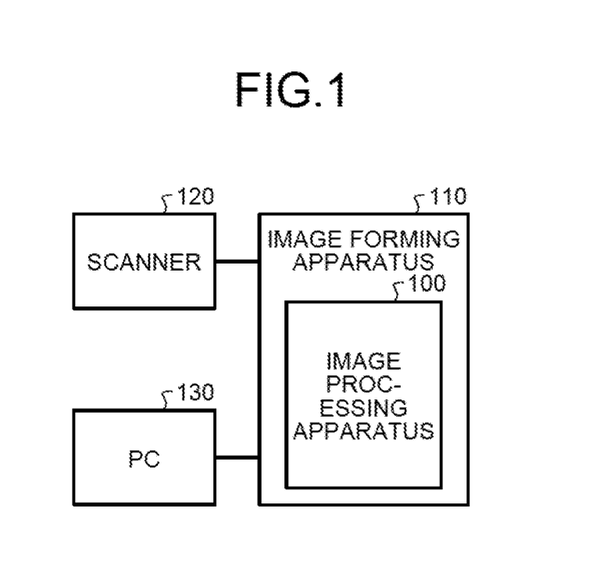
FIG. 1 is a block diagram of an exemplary configuration of a system including an image processing apparatus according to an embodiment of the present invention.

FIG. 1 is a block diagram of an exemplary configuration of a system including an image processing apparatus according to the embodiment. An image processing apparatus 100 outputs image data onto which given processing has been performed to an image forming apparatus 110. A serial type inkjet printer is described as an example of the image forming apparatus 110. A scanner 120, a personal computer ("PC" below) 130, etc. are connected to the image processing apparatus 100 via a given interface. The serial type inkjet printer is exemplified here as the image forming apparatus 110. Alternatively, another image forming apparatus may be used.

The scanner 120 is configured of an optical scanning device that performs a known original-fixed or original-moving optical scanning method. The scanner 120 concentrates the reflected light obtained by optically scanning (emitting light) onto a CCD (solid imaging device) and performs photoelectric conversion to acquire digital image data. In this example, the scanner 120 and the image forming apparatus 110 are separated. Alternatively, for example, the image forming apparatus 110 and the scanner 120 may be integrated into, for example, a multifunction peripheral.

The PC 130 is connected to a network (not shown), has a given interface, and is configured to output image data to be printed in a form of a file to the image forming apparatus 110.

Figure 2:
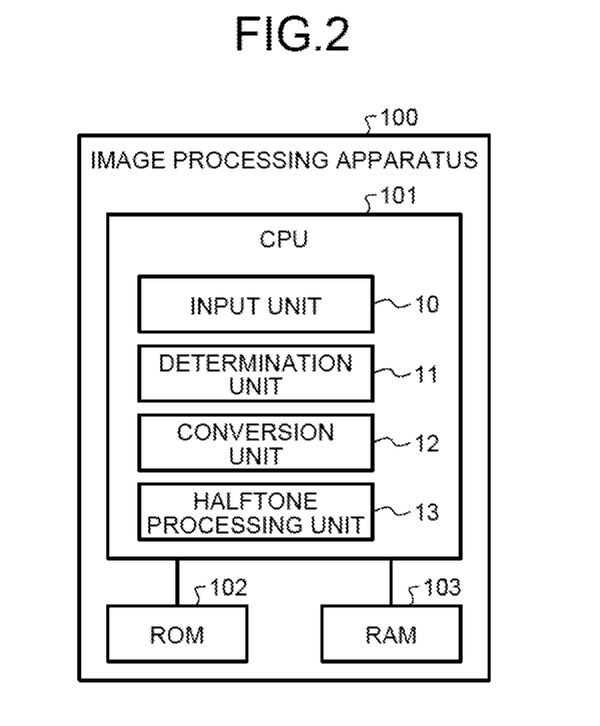
FIG. 2 is a block diagram of an exemplary functional configuration of the image processing apparatus.

FIG. 2 is a block diagram of an exemplary functional configuration of the image processing apparatus 100. The image processing apparatus 100 is a microcomputer system. In other words, the image processing apparatus 100 includes a central processing unit (CPU) 101, a read only memory (ROM) 102, and a random access memory (RAM) 103.

The CPU 101 has the functions of an input unit 10, a determination unit 11, a conversion unit 12, and a halftone processing unit 13. The CPU 101 performs the image processing, which will be described below, according to a program that is stored in the ROM 102. All or a part of the input unit 10, the determination unit 11, the conversion unit 12, and the halftone processing unit 13 may be configured of hardware.

The input unit 10 inputs printing information containing image data. When the pixel value of the top pixel of among successive N (N is an integer equal to or larger than 2) pixels in the image data is a specific value, the conversion unit 12 sets, with regard to pixels from a pixel adjacent to the top pixel to a N−the pixel, a pixel having a pixel value that is not the specific value as a new top pixel, refers to the data of pixels from the newly set top pixel to a N-th pixel, and performs a conversion into pixel values that are calculated with coefficient values according to the magnitude of the pixel values. The conversion unit 12 performs a given resolution conversion according to the result of determinations made by the determination unit 11.

In other words, in the resolution conversion according to the embodiment, a pixel of interest corresponding to a pixel after the resolution conversion is set at the input image and the pixel values of the pixel of interest and successive N (N is an integer equal to or larger than pixels of image data in a direction in which the resolution is lowered and at a downstream side are referred to. Here, when the pixel of interest has no pixel value, it is checked whether the adjacent pixel has a pixel value. When the adjacent pixel has a pixel value, the pixel is set as a new pixel of interest and the pixel values of the N pixels from the new pixel of interest are used to create image data after the resolution conversion.

The determination unit 11 determines whether the image data in the printing information that is received at the input unit 10 is data that was generated by and output from the PC 130 or data that was generated by and output from the scanner 120. In this manner, by narrowing data on which the resolution conversion is to be performed to image data to which the resolution conversion performed by the conversion unit 12 is effective, it is possible to obtain printing results with high quality.

The determination unit 11 determines whether the image data is of an object image. When the image data is of an object image, the conversion unit 12 performs a given resolution conversion. In this manner, by narrowing data on which the resolution conversion is to be performed to image data to which the resolution conversion performed by the conversion unit 12 is effective, it is possible to obtain printing results with high quality.

The determination unit 11 further determines whether the image data is line or character data. When the image data is line or character data, the conversion unit 12 performs a given resolution conversion. In this manner, by narrowing data on which resolution conversion is to be performed to an area having line or character data to which the resolution conversion performed by the conversion unit 12 is effective, it is possible to obtain printing results with high quality.

The determination unit 11 further determines whether the image data contains a natural image, the conversion unit 12 limits the resolution conversion for an area containing a natural image. In this manner, by limiting the present resolution conversion for the input image data when there is a resolution conversion more effective to the input image data than the resolution conversion, it is possible to obtain printing results with high quality.

The halftone processing unit 13 performs halftone processing in order to convert the image data after the resolution conversion into a data form printable by the image forming apparatus 110 as described below.

In the serial type inkjet printer that is the image forming apparatus 110, the direction in which the carriage moves is referred to as the main-scanning direction and the direction in which a recording medium is conveyed is referred to as the sub-scanning direction. Unless otherwise denoted herein, the left-right direction in the image data shown in the drawings corresponds to the "main-scanning direction" and the up-down direction corresponds to the "sub-scanning direction".

According to the embodiment, in order to achieve the maximum productivity, the conversion method of performing a resolution conversion in which the resolution of the input image data in any one of the main-scanning direction and the sub-scanning direction is lowered to 1/N that can be completed by performing scanning with a recording head once is performed will be described here. First, the data of successive N pixels in a direction in which the resolution is lowered is referred to. When the top pixel from among the successive N pixels has no pixel value, the pixel values of pixels from a pixel adjacent to the top pixel to a N-th pixel are examined sequentially. Here, a pixel having a pixel value is set as a new top pixel and the data of N pixels from the top pixel is newly referred to. Here, a resolution conversion is performed in which pixel values that are calculated in a way that (dark) pixels each having a large pixel value is multiplied by a large coefficient and (light) pixels each having a small pixel value is multiplied by a small coefficient are used as the pixel values after the resolution conversion. This will be described with reference to FIGS. 3 to 7.

Figure 3:
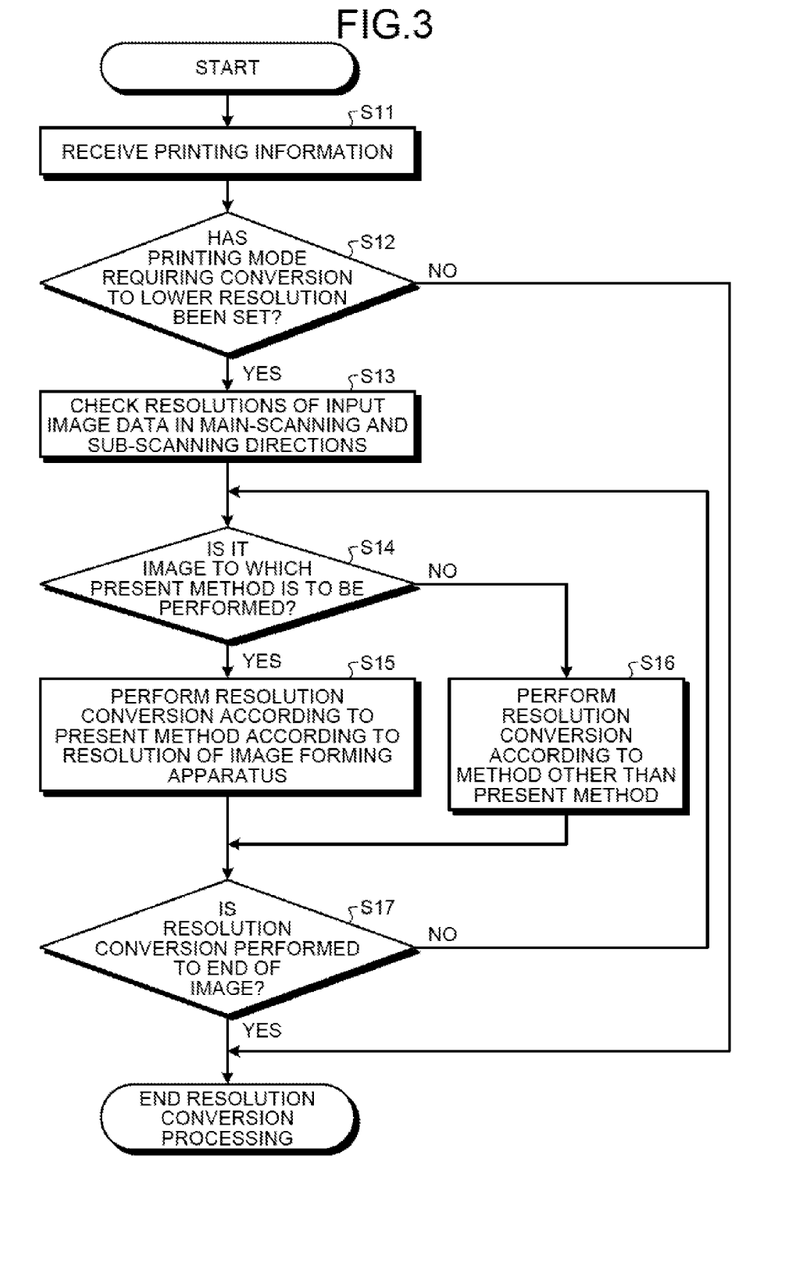
FIG. 3 is a flowchart of exemplary operations of resolution conversion processing performed by the image processing apparatus according to the embodiment.

FIG. 3 is a flowchart of exemplary operations of the resolution conversion processing performed by the image processing apparatus 100 according to the embodiment. The operations are performed by the CPU 101. First, the input unit 10 receives printing information from the scanner 120 or the PC 130 (step S11). The received printing information contains printing setting information and image data. The printing setting information contains, in addition to the file name of data to be printed, the paper size, and the name of the output device, various types of information including a printing mode or adjustment information that is set to realize the image quality and the printing speed that the user wants.

From the printing setting information contained in the printing information, the determination unit 11 then determines whether or not a printing mode that requires a resolution conversion on the input image data when printing is performed has been set (step S12). In general, in many cases, in a mode in which the maximum speed is to be achieved, the resolution of the input image is converted into a lower resolution in order to reduce the load due to the halftone processing on the input image and the amount of data transfer. For this reason, when a mode in which the maximum speed is to be achieved is selected for the printing mode, for example, the resolution is converted into a lower resolution.

At step S12, when it is determined that a printing mode that requires a resolution conversion of the input image data when printing is performed has been set, the determination unit 11 goes to step S13. When no resolution conversion is required on the image data when printing is performed, the operations of the present resolution conversion end.

The determination unit 11 then checks the resolutions of the input image data in both the main-scanning and sub-scanning directions (step S13). In general, the resolution is checked according to the printing setting information; however, even if no resolution information is contained, the image forming apparatus 110 or the PC 130 measures the numbers of pixels in the main-scanning and sub-scanning directions and they are compared to the printing size. A method of calculating a resolution in this manner may also be used.

The determination unit 11 determines whether or not the image data is an image data to which the resolution conversion according to the present method is to be performed (step S14). In the present method, when unexpected data occurs in the background of the image data, or data occurs around straight lines, due to reading by the scanner 120, the position to be referred to is shifted even in a location other than the intended location. For this reason, the use of another method may be effective. Thus, when the input image data is of "a read image", it may be determined that the resolution conversion according to the present method will not be performed.

For the method of determining "whether the image data is a read image data", for example, hardware may be provided with a function with which it is possible to know that the image data is "a copy setting" or may analyze the image data to recognize that the background is not at 0.

Even if the image data is not a read image data but image data that is created by the PC 130, the resolution conversion according to the present method is effective when there is a line or character object. For this reason, it can be assumed to perform a conversion resolution by selecting a resolution conversion method per object in the image data in a way that, for example, the present method is performed and a resolution conversion according to another method is performed on an object of, for example, another photograph or a solid image.

At step S14, when it is determined that the image data is an image to which the resolution conversion according to the present method is to be performed, the conversion unit 12 performs conversion processing on the image data (step S15). On the other hand, when it is determined at step S14 that the image data is not an image to which the resolution conversion according to the present method is to be performed, the conversion unit 12 performs a resolution conversion according to a method other than the present method (step S16).

By performing the above-described resolution conversion from "the beginning" to the "the end" of the image data, the resolution of the whole image data is converted (the loop processing from step S17 to step S14).

In the conversion processing at step S15, when a resolution conversion to lower the resolution of the input image in the main-scanning direction or the sub-scanning direction to 1/N, first, a pixel of interest corresponding to a pixel after the resolution conversion is set at the input image. Next, the pixel values of the pixel of interest and successive N pixels in the direction in which the resolution is lowered and at the downstream side of the data processing are referred to. When the pixel of interest has no pixel value (i.e., the pixel value is 0), it is checked whether the adjacent pixel has a pixel value. When the adjacent pixel has a pixel value, the pixel is set as a new pixel of interest and, using the pixel values of the N pixels from the new pixel of interest, image data after the resolution conversion is created.

A case where the resolution is converted into ½ by using the present method will be described as an exemplary resolution conversion. The expressions used in a case where the pixel of interest has data and in a case where the pixel of interest has no data are as follows (see FIGS. 4A and 4B for the details).

Figure 4A:
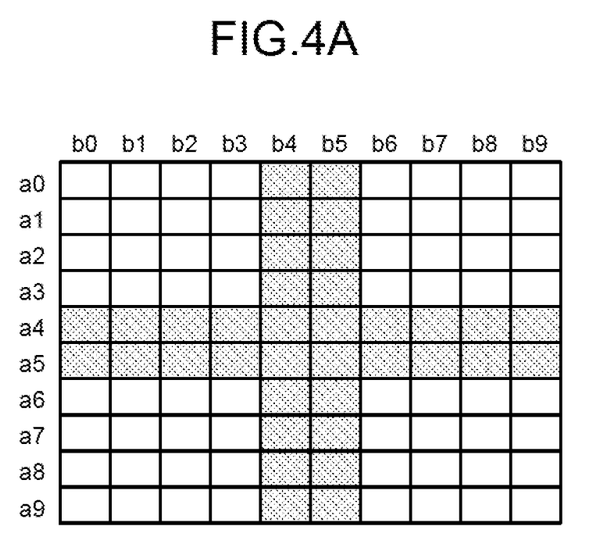
FIGS. 4A and 4B are explanatory diagrams showing exemplary sets of image data before resolution conversion that have the same horizontal line width.
Figure 4B:
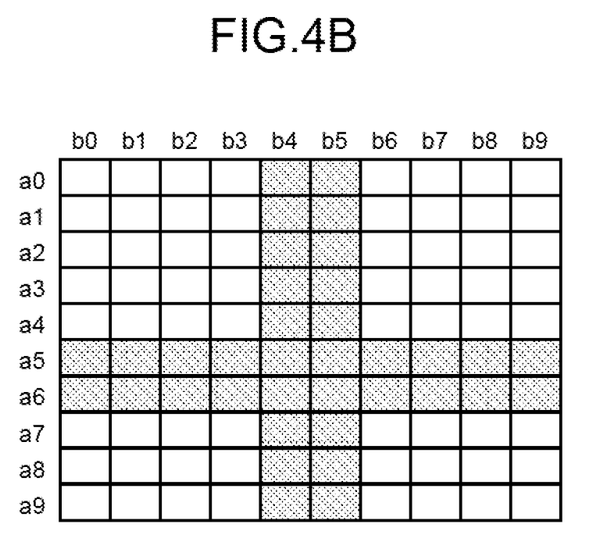

(1) Case where pixel of interest has data (1-1) When the pixel of interest≥the pixel first adjacent to the pixel of interest, (the pixel of interest×N1+the pixel first adjacent to the pixel of interest×N2)/(N1+N2) is used, and (1-2) when the pixel of interest<the pixel first adjacent to the pixel of interest, (the pixel of interest×N2+the pixel first adjacent to the pixel of interest×N1)/(N1+N2) is used, where the coefficients satisfy N1>N2.

(2) Case where pixel of interest has no data (2-1) When the pixel first adjacent to the pixel of interest≥the pixel second adjacent to the pixel of interest, (the pixel first adjacent to the pixel of interest×N1+the pixel second adjacent to the pixel of interest×N2)/(N1+N2) is used; and (2-2) when the pixel first adjacent to the pixel of interest<the pixel second adjacent to the pixel of interest, (the pixel first adjacent to the pixel of interest×N2+the pixel second adjacent to the pixel of interest×N1)/(N1+N2) is used, where, the coefficients satisfy N1>N2.

When the resolution is converted into ⅓, three pixels including the pixel of interest are referred to for the calculation.

After the resolution conversion, the halftone processing unit 13 performs halftone processing in order to perform a conversion into a data form printable by the image forming apparatus 110. In general, the data before the halftone processing is expressed by 8-bit data, i.e., in 256 tones, and the data after the processing is converted into 1-bit or 2-bit data. For the halftone processing, various methods, such as dither method and error diffusion method, may be used.

Ten evaluators (designers whose use drawings in their work) performed evaluation checks by making a comparing by sight on image samples having the line quality printed after the above-described resolution conversion was performed. The evaluations were made on image data having the size in the main scanning direction is twice as large as the size in the sub-scanning direction. As a result, all the evaluators evaluated that the horizontal lines, vertical lines, and lines oblique by 45 degrees were preferable in the images after the above-described resolution conversion.

A specific example of the above-described resolution conversion will be described here. FIGS. 4A and 4B are explanatory diagrams showing exemplary sets of image data having before resolution conversion that have the same horizontal line width. FIG. 4A shows a case where a4 and a5 have image data in the sub-scanning direction and FIG. 4B shows a case where a5 and a6 have image data in the sub-scanning direction.

FIGS. 5A and 5B show an exemplary resolution conversation on the image data shown in FIGS. 4A and 4B. This example shows exemplary image data obtained by a conversion of halving the resolution in the sub-scanning direction (e.g., from 600 dpi to 300 dpi). FIG. 5A shows the image data after the resolution conversion on the image data shown in FIG. 4A, and FIG. 5B shows the image data after the resolution conversion on the image data shown in FIG. 4B.

FIGS. 4A to 5B show the resolution conversion of halving the resolution of the original image in the sub-scanning direction. When the resolution of the input image is converted to ½, as shown in FIGS. 5A and 5B, the resolution conversion is performed by performing a weighting calculation based on the pixel values of a0 to a1, a2 to a3, a4 to a5, a6 to a7, and a8 to a9. For the pixel of interest, a0, a2, a4 . . . are set.

As for the pixel values of A0 to A4 shown in FIGS. 5A and 5B, the pixel value of A0 is calculated based on the pixel values of a0 to a1, the pixel value, of A1 is calculated based on the pixel values of a2 to a3, the pixel value of A2 is calculated based on the pixel values of a4 to a5, the pixel value of A3 is calculated based on the pixel values of a5 to a7, and the pixel value of A4 is calculated based on the pixel values of a0 to a9 to convert the resolution.

In the example shown in FIG. 4A, after the resolution is converted, only A2 for which the conversion is performed based on the pixel values of a4 and a5 has a pixel value.

On the other hand, while FIG. 4B shows the image data having the same width of that shown in FIG. 4A in the input image, a5 and a6 have pixel values and the pixel of interest is not at the top. When the present method is used here, the pixel values of a4 and a5 are referred to at the beginning to calculate the pixel value of A2; however, because a4 that is set as the pixel of interest has no pixel value, the pixel of interest is shifted by one pixel and a5 is newly set as the pixel of interest. The result of the calculation performed with reference to the pixel values of a5 and a6 serves as the pixel value of A2.

Subsequently, a6 servers as the pixel of interest after a4; however, because the pixel value of a6 is not 0 and the pixel of interest is shifted by one pixel just before, the shifting continues successively. Accordingly, a7 serves as the pixel of interest to calculate the pixel value of A3 and the result of calculation with reference to the pixel values of a7 and a8 is obtained. Because a7 and a8 have no pixel value, the pixel value of A3 is 0. Next, a8 serves as the pixel of interest. When "three" is set for the number of "successive pixels that have no pixel value" according to which shifting of the pixel of interest is reset, a7 to a9 have no pixel values. Here, shifting of the pixel of interest is reset, and the pixel value of A4 is obtained by a calculation with reference to the pixel value of a9 adjacent to a8 that is the original pixel of interest. This is the exemplary processing shown in FIG. 5B.

The above-described exemplary resolution conversion represents the example where the resolution in the sub-scanning direction is halved. Alternatively, it is also possible to perform a resolution conversion in the same manner when halving the resolution in the main-scanning direction.

Figure 6A:
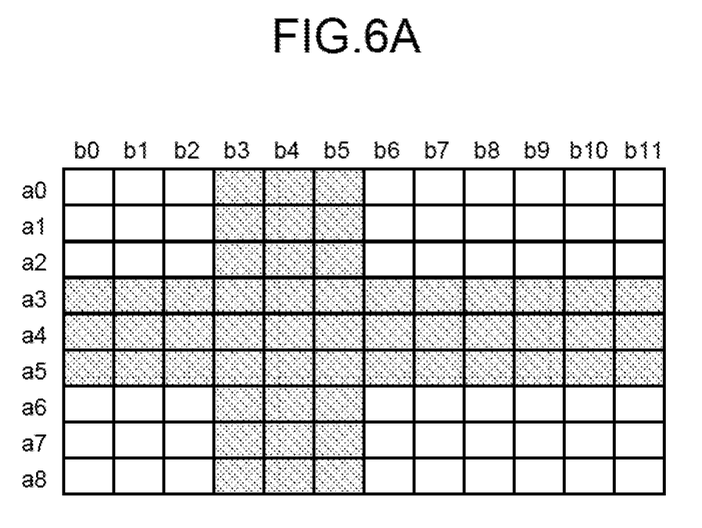
FIGS. 6A and 6B are explanatory diagrams showing exemplary resolution conversion in a case where a pixel of interest has data.
Figure 6B:
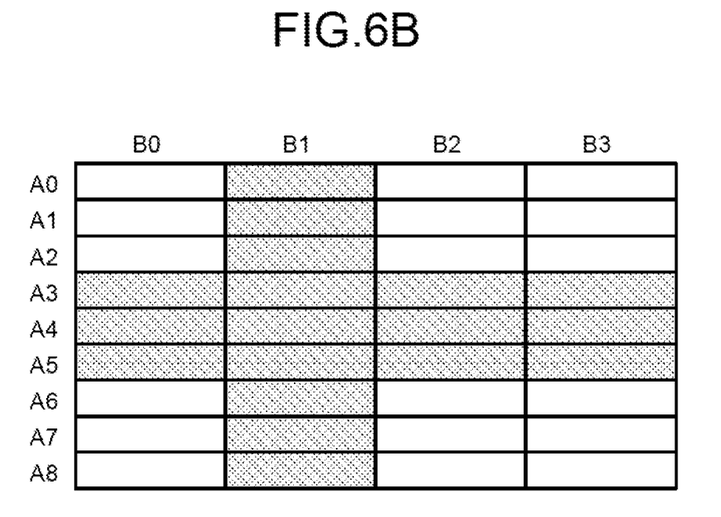

The method of performing resolution conversion processing for converting the resolution in the main-scanning direction to ⅓ will be described with reference to FIGS. 6A to 7B. FIGS. 6A and 6B are explanatory diagrams showing an exemplary resolution conversion in a case where a pixel of interest has data. FIG. 6A shows a case where b3 to b5 have image data, and FIG. 6B shows image data after the resolution conversion according to the present method.

Figure 7A:
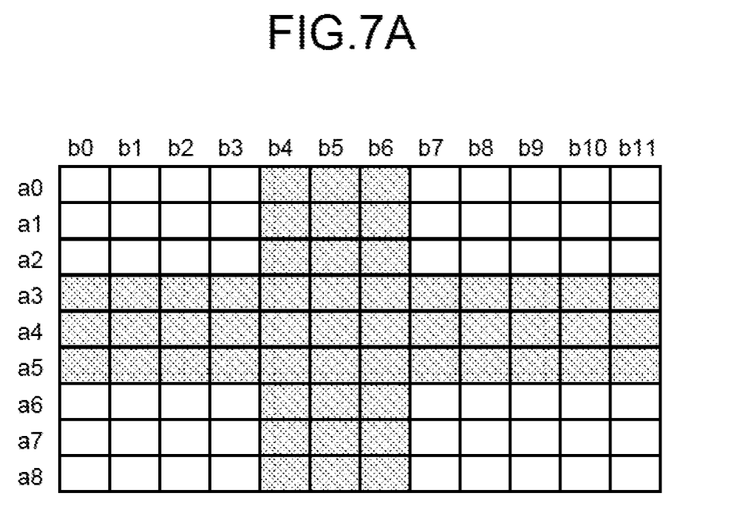
FIGS. 7A and 7B are explanatory diagrams showing exemplary resolution conversion in a case where a pixel of interest has no pixel value.
Figure 7B:
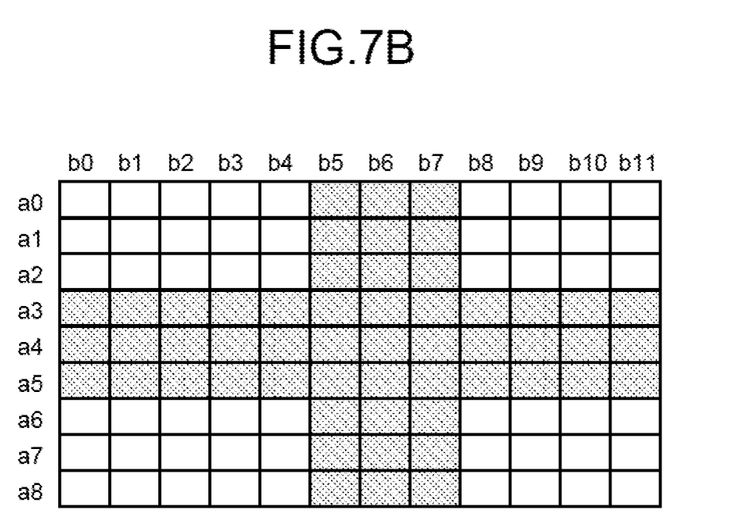

FIGS. 7A and 7B are explanatory diagrams showing an exemplary resolution conversion in a case where a pixel of interest has no pixel value. FIG. 7A shows a case where b4 to b6 have image data, and FIG. 7B shows a case where b5 to b7 have image data.

FIGS. 6A, 6B, 7A and 7B will be described here. To convert the resolution of an input image to ⅓, as shown in FIGS. 6A and 6B, the pixel value of B0 is calculated based on the pixel values of b0 to b2, the pixel value of B1 is calculated based on the pixel values of b3 to b5, the pixel value of B2 is calculated based on the pixel values of b6 to b8, and the pixel value of B3 is calculated based on the pixel values of b9 to b11 to convert the resolution. As the pixel of interest, b0, b3, . . . are set here.

As shown in FIGS. 6A and 6B, because the pixel of interest b3 is at the top from among B3 to b6 having image data, it is possible to perform the resolution conversion without changing the position of the pixel values to be referred to.

On the other hand, while the input image shown in FIGS. 7A and 7B is image data having the same width as that shown in FIGS. 6A and 6B, there are pixels having pixel values at b4 to b6 and b5 to b7, i.e., the pixel of interest is not at the top. For this reason, as shown in FIG. 7A, the pixel of interest is shifted to b4 by using the present method and the pixel values of b4 to b6 are used to perform a calculation. In this manner, the resolution conversion is performed so as to obtain the same image as that shown in FIG. 6B. Expressions used in a case where the pixel of interest has data and a case where the pixel of interest has no data are as follows.

(1) Case where pixel of interest has data (1-1) When the pixel of interest≥the pixel first adjacent to the pixel of interest≥the pixel second adjacent to the pixel of interest, (the pixel of interest×N1+the pixel first adjacent to the pixel of interest×N2+the pixel second adjacent to the pixel of interest×N1)/(N1+N2+N3), and (1-2) when the pixel of interest≥the pixel second adjacent to the pixel of interest≥the pixel first adjacent to the pixel of interest, (the pixel of interest×N1+the pixel second adjacent to the pixel of interest×N2+the pixel first adjacent to the pixel of interest×N3)/(N1+N2+N3), where the coefficients satisfy N1>N2>N3.

(2) Case where pixel of interest has no data and pixel first adjacent to pixel of interest has data (2-1) When the pixel first adjacent to the pixel of interest≥the pixel second adjacent to the pixel of interest≥the pixel third adjacent to the pixel of interest, (the pixel of interest×N1+the pixel second adjacent to the pixel of interest×N2+the pixel third adjacent to the pixel of interest×N3)/(N1+N2+N3); and (2-2) when the pixel first adjacent to the pixel of interest≥the pixel third adjacent to the pixel of interest≥the pixel second adjacent to the pixel of interest, (the pixel of interest×N1+the pixel third adjacent to the pixel of interest×N2+the pixel second adjacent to the pixel of interest×N3)/(N1+N2+N3), where, the coefficients satisfy N1>N2>N3.

(3) Case where pixel of interest and pixel first adjacent to pixel of interest have no data and pixel second adjacent to pixel of interest has data (3-1) When the pixel second adjacent to the pixel of interest≥the pixel third adjacent to the pixel of interest≥the pixel fourth adjacent to the pixel of interest, (the pixel of interest×N1+the pixel third adjacent to the pixel of interest×N2+the pixel fourth adjacent to the pixel of interest×N3)/(N1+N2+N3); and (3-2) when the pixel second adjacent to the pixel of interest≥the pixel fourth adjacent to the pixel of interest≥the pixel third adjacent to the pixel of interest, (the pixel of interest×N1+the pixel fourth adjacent to the pixel of interest×N2+the pixel third adjacent to the pixel of interest×N3)/(N1+N2+N3), where the coefficients satisfy N1>N2>N3.

The resolution conversion according to the embodiment described above can be summarized as described below. When a resolution conversion to lower the resolution of an input image in the main-scanning direction or the sub-scanning direction to 1/N is performed, first, a pixel of interest corresponding to a pixel after the resolution conversion is set at the input image. Next, the pixel values of the pixel of interest and successive N pixels in the direction in which the resolution is lowered and at a downstream side of the data processing are referred to. For example, when the resolution is converted to ½, two pixel values of the pixel of interest and the pixel adjacent to the pixel of interest are referred to. When the resolution is converted to ⅓, three pixel values of the pixel of interest, the pixel first adjacent to the pixel of interest, and the pixel adjacent to the first adjacent pixel are referred to. When the pixel of interest has no pixel value (i.e., the pixel value is 0), it is checked whether the adjacent pixel has a pixel value. When the adjacent pixel has a pixel value, the pixel is set as a new pixel of interest and, using the pixel values of the N pixels from the new pixel of interest, image data after the resolution conversion is created (see FIGS. 4A to 5B for the details).

According to the above-described processing, after the positon of the pixel of interest that is referred to is shifted, the resolution conversion in a state where the reference position has been shifted by N pixels is continued; however, when it is successively determined that "the pixel of interest has no pixel value" for a given number of times or more while the resolution conversion in a state where the reference position has been shifted by N pixels is being continued, it is unnecessary to continue the state where the reference position has been shifted. For this reason, shifting of the position of the pixel of interest to be referred to is reset and the processing returns to a normal resolution conversion (without shifting of the reference position).

For example, when the resolution of an original image is converted to ⅓, and if there is a part that requires a resolution conversion in which the reference position is shifted by only one pixel, the resolution conversion in which the following pixel of interest is shifted by one pixel is successively performed. Furthermore, in the case of an image that requires additional shifting of the reference position by one pixel in a state where the pixel of interest has been shifted by one pixel, the amount of the new shift by one pixel is added to the amount of the original shift by one pixel and a resolution conversion in which the pixel of interest is shifted by two pixels in total is performed. The reference position is reset when it is successively determined that the pixel of interest has no pixel for a given number of times or more as in the above-described case where the pixel of interest is shifted by one pixel.

According to this processing, when there is image data before a resolution conversion, the image data is assuredly reflected to the image data after the resolution conversion so that no missing image data occurs. As for lines each configured of the same number of pixels, because the number of pixels after the resolution conversion does not change, the line width will not change after the resolution conversion depending on the set of coordinates of the input image data.

The program executed according to the embodiment is provided in a way that it is previously installed in the ROM 102. Alternatively, the program executed according to the embodiment may be recorded in a non-transitory computer-readable recording medium and provided as a computer program product. For example, the program may be provided in a way that it is recorded in a non-transitory computer-readable recording medium, such as a CD-ROM, a flexible disk (FD), a CD-R, or a digital versatile disc (DVD) in a file in an installable or executable form.

Alternatively, the program executed according to the embodiment may be provided in a way that it is stored in a computer connected to a network, such as the Internet, and is downloaded via the network. Alternatively, the program executed according to the embodiment may be provided or distributed via a network, such as the Internet.

The program in the ROM 102 executed according to the embodiment is configured as a module containing the functions of the CPU 101. As practical hardware, the CPU 101 (processor) loads the program from the main recording medium and executes the program so that the units are loaded into the main storage unit, such as the RAM 103. The program is then generated in the main storage unit.

The embodiment provides an effect that it is possible to prevent missing image data and lowering of the image quality and also prevent a difference caused in the quality of printing lines.

Although the invention has been described with respect to specific embodiments for a complete and clear disclosure, the appended claims are not to be this limited but are to be construed as embodying all modifications and alternative constructions that may occur to one skilled in the art that fairly fall within the basic teaching herein set forth.

What is claimed is:

1. An image processing apparatus comprising:
   an input unit that inputs printing information containing image data; and
   a conversion unit that, when a pixel value of a first pixel from among successive N pixels (N is an integer equal to or larger than 2) of the image data is zero, (i) examines sequentially the successive N pixels until a pixel amongst the successive N pixels is discovered to have a non-zero pixel value, (ii) sets the discovered pixel as a new first pixel and (iii) performs a conversion of the successive N pixels, starting from the new first pixel, using coefficient values calculated based on a magnitude of each of the successive N pixels.

2. The image forming apparatus according to claim 1, further comprising
   a determination unit that determines whether the image data contained in the printing information was generated by and output from a computer or was generated by and output from a reading device, wherein
   the conversion unit performs a given resolution conversion to the image data according to the result of the determination by the determination unit.

3. The image forming apparatus according to claim 2, wherein the determination unit determines whether the image data is of an object image, and the conversion unit performs the given resolution conversion to the image data when the image data is of the object image.

4. The image forming apparatus according to claim 2, wherein the determination unit determines whether the image data is of a line or character data, and when the image data is of the line or character data, the conversion unit performs the given resolution conversion to the image data.

5. The image forming apparatus according to claim 2, wherein the determination unit determines whether the image data contains a natural image, and the conversion unit limits a resolution conversion for an area containing the natural image.

6. An image processing method comprising:
   inputting printing information containing image data; and
   when a pixel value of first pixel from among successive N pixels (N is an integer equal to or larger than 2) of the image data is zero, (i) examining sequentially the successive N pixels until a pixel amongst the successive N pixels is discovered to have a non-zero pixel value, (ii) setting the discovered pixel as a new first pixel and (iii) performing a conversion of the successive N pixels, starting from the new first pixel, using coefficient values calculated based on a magnitude of each of the successive N pixels.

7. A non-transitory computer-readable recording medium that contains a computer program that causes a computer to execute:
   inputting printing information containing image data; and
   when a pixel value of a first pixel from among successive N pixels (N is an integer equal to or larger than 2) of the image data is zero, (i) examining sequentially the successive N pixels until a pixel amongst the successive N pixels is discovered to have a non-zero pixel value, (ii) setting the discovered pixel as a new first pixel and (iii) performing a conversion of the successive N pixels, starting from the new first pixel, using coefficient values calculated based on a magnitude of each of the successive N pixels.

* * * * *